though in the use to which it is here illustrated as applied it is preferable that the valve be assembled to be of the lapping type. By "lapping" is meant that the valve which has three ports, one of which can be alternately connected to the other two, can not have all three ports connected at the same

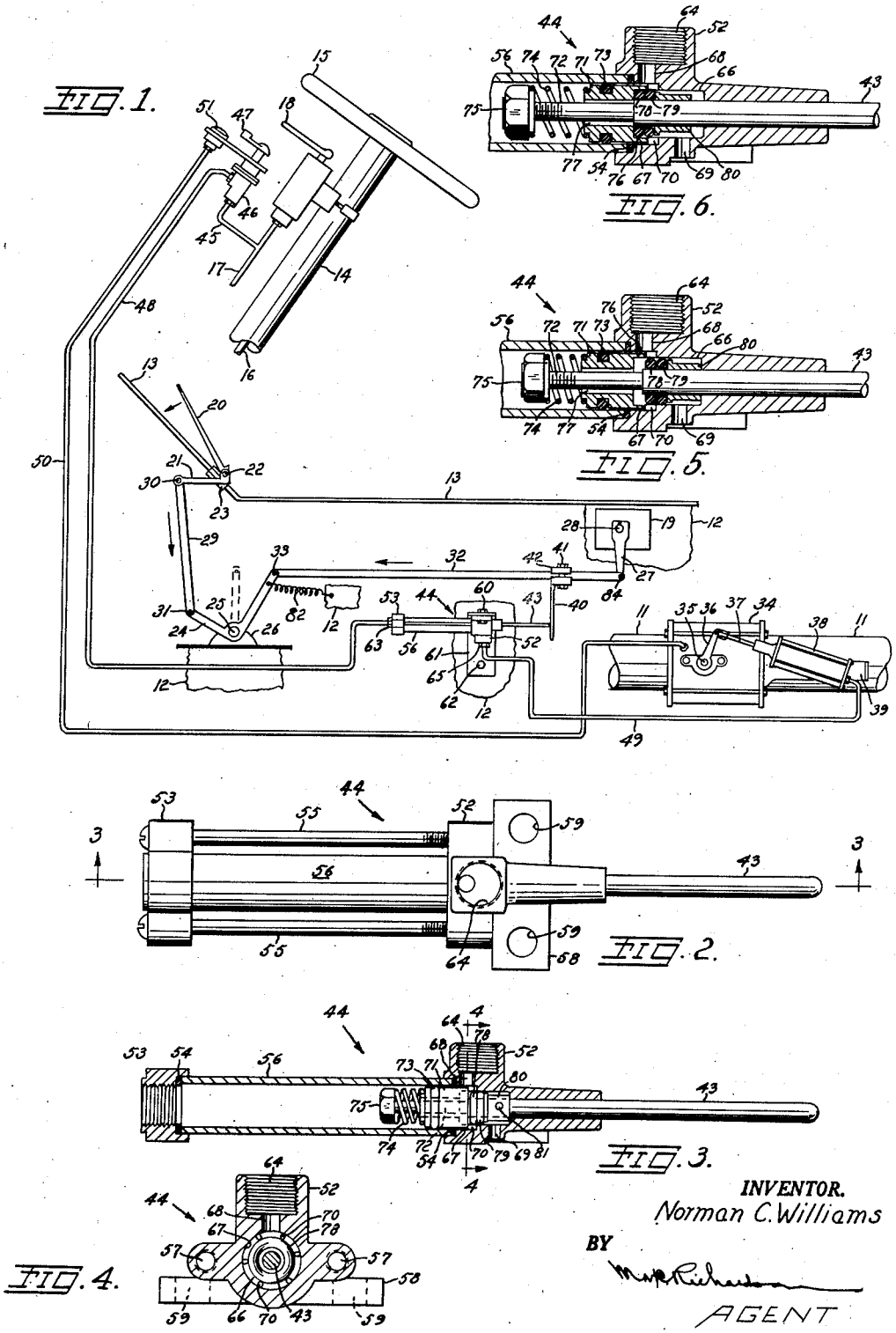

United States Patent Office 2,800,112
Patented July 23, 1957

2,800,112

OVERTRAVEL STOP AND WASTE VALVE

Norman C. Williams, Portland, Oreg., assignor to Power Brake Equipment Company, a corporation of Oregon Application April 5, 1955, Serial No. 499,316

4 Claims. (Cl. 121—46.5)

This invention relates generally to fluid control valves and more particularly to three way pneumatic valves of the type in which one of the three outlet ports can be alternately connected to the other two outlet ports.

Specifically the valve of this invention is an overtravel relief valve designed for under pedal use in the Exhaust Brake System described in U. S. patent application S. N. 457,074 filed September 20, 1954, by Norman C. Williams, now abandoned. The present valve is particularly adapted for use with an air pressure operated exhaust braking system rather than with a vacuum operated system.

In such a system of vehicle braking by controlled blocking of the engine exhaust conduit, a manually operable control valve is mounted in the cab conveniently for the driver. Air under pressure from the vehicle air storage tank is throttled by the cab mounted valve to a brake line leading to an operating cylinder controlling the damper in the exhaust conduit. The cab mounted valve is used for controlling the exhaust damper to any degree of exhaust brake application or release. However in actual operation occasions will arise when the driver will want to supply fuel to the engine quickly for driving power and he may have neglected to release the exhaust brake. This could be in either regular or emergency operation.

To take care of this situation a valve having the brake air releasing function of the valve of this invention is required to be installed to cooperate with the fuel supply throttle pedal in order that on the least depression of the fuel throttle pedal the air pressure will be released from the brake line of the exhaust conduit damper operating cylinder. It is understood that the foot throttle pedal operates through a series of levers, bell cranks, etc., to control the fuel supply to the engine and that there would be neither room for, nor inherent safety in, mounting the valve directly under the pedal to be contacted thereby.

It is a primary object of this invention to provide an air pressure release valve for insertion in the exhaust brake operator air line of an exhaust brake system which automatically will be set or reset to a position of continuity of the brake line by the air supply impressed on the line, which on the slightest depressing movement of the fuel throttle pressure will block the brake line and release the air pressure from the exhaust brake operator and which, after operation, has whatever overtravel that may be required not to interfere with the further depression of the fuel throttle pedal.

It is understood that such a valve which will satisfy the above requirements will have other uses and advantages which I desire and claim for my exclusive control. It will further be seen that the three way valve of this invention may be quickly and easily assembled to be either of the lapping or non-lapping type although in the use to which it is here illustrated as applied it is preferable that the valve be assembled to be of the lapping type. By "lapping" is meant that the valve which has three ports, one of which can be alternately connected to the other two, can not have all three ports connected at the same time. A non-lapping valve can connect one port alternately to the other two but in transition from one of its two positions to the other all three ports will be connected for an interim period.

How the above and other objects are attained and the usefulness of the unique valve of this invention will be explained in the following description referring to the attached drawing in which Fig. 1 is a fragmentary schematic drawing of an exhaust brake system including the valve of this invention of which Fig. 2 is a plan view, Fig. 3 is a vertical section along the line 3—3 of Fig. 2, Fig. 4 is a transverse section along the line 4—4 of Fig. 3, Fig. 5 is a fragmentary enlarged view of part of Fig. 3, and Fig. 6 is similar to Fig. 5 but with the valve set to its other operating position.

Like numerals of reference refer to like parts in the several figures of the drawing.

Referring now to the drawing, in Fig. 1 is shown fragmentarily parts of a truck vehicle including an exhaust conduit 11, a frame 12, a floor board 13, a steering wheel post 14, a steering wheel 15, a steering wheel shaft 16, a compressed air supply line 17, a hand throttle for the truck air brakes 18, an engine fuel supply means 19, a fuel supply throttle pedal 20, and linkage from pedal 20 to fuel supply means 19, the linkage including arm 21 secured to pedal 20 hinged at 22 to support 23, bell crank 24 pivoted at 25 on support 26, arm 27 secured to shaft 28 of fuel supply means 19, link 29 pivoted at 30 to arm 21 and at 31 to bell crank 24, and link 32 pivoted at 33 to bell crank 24 and at 84 to arm 27.

An exhaust brake housing 34 inserted in exhaust conduit 11, encloses an exhaust damper, not shown, having a shaft 35 secured to arm 36 pivoted to piston rod 37 of compressed air operating cylinder 38 pivoted on bracket 39 of housing 34. Valve operating arm 40 adjustable along link 32 is secured thereto by bolts 41 and cap 42. It is seen that as pedal 20 is depressed link 32 moves horizontally to the left but also upwardly so that the arm 40 pressing stem 43 of valve 44 to the left slides upwardly along stem with very little side force applied to stem 43.

Air line 45 leads from air supply line 17 to manual exhaust brake operating valve 46 by the manipulation of handle 47 of which the air pressure applied to operating cylinder 38 through exhaust brake line 48 valve 44 and line 49 can be varied at will by the driver. Gage line 50 connects the interior of the exhaust damper housing 34 on the upstream side of the exhaust damper therein with pressure gage 51 mounted adjacent to hand valve 46.

The unique and useful valve 44 of this invention shown in detail in Figures 2 to 6 is seen to comprise a body casting 52 between which and inlet fitting 53 tube 56 is sealed by washers 54 and clamped by screws 55 as shown in Figures 2 and 3. Body 52 as shown in Figures 2 and 4 is formed with threaded holes 57 to receive screws 55 and with bracket 58 formed with holes 59 to receive bolts 60 to secure body 52 to bracket 61 which in turn is secured to frame 12 by screws 62. See Figure 1.

Outer end fitting 53 is bored and threaded in axial alignment with tube 56 to receive tube fitting 63 connecting brake line 48 with valve 44. See Figure 1. Body 52 is bored and threaded as at 64 to receive tube fitting 65 connecting body 52 with brake line 49. See Figure 1.

As clearly shown in Figure 5, the outer end of body 52 is bored axially of tube 56 to receive and guide valve stem 43 and at its inner end is counterbored to form cylindrical exhaust valve seat 66 and again counterbored as at 67 to form interiorly of body 52 an extension of the interior of tube 56. The interior of bore 67 is connected to valve outlet 64 by outlet port 68 formed in body 52. The interior of counterbore 66 is connected with the atmosphere by exhaust port 69 formed in body 52. Ribs 70 having the inside diameter of bore 66 are spacedly formed on the interior of bore 67 and extend toward tube 56 from the junction of bores 66 and 67.

Inlet valve collar 71, of somewhat lesser outside diameter than tube 56 and substantially greater inside diameter than the outside diameter of the inner reduced end 72 of valve stem 43, is slidably positioned in tube 56 and sealed thereto by O ring 73 as shown. Collar 71 is reduced in diameter at one end to receive and guide one end of coil spring 74 assembled on the end 72 of stem 43 between collar 71 and nut 75 threaded as shown on end 72 of stem 43. The other end of valve collar 71 is counterbored to form the cylindrical or slightly conical inlet valve seat 76. The enlarged bore 77 of collar 71 around stem end 72 forms an inlet port for valve seat 76.

O-rings 78, 79 together form the inlet and exhaust valves and could be formed of one piece alternately to be positioned to engage either the inlet valve seat 76 or the exhaust valve seat 66. However whether the valve is to be assembled to be lapping or non-lapping depends on the axial length of valves 78, 79. It is found convenient to make the valve of one or two O-rings. If only one O-ring is used the valve will be non-lapping but if two O-rings are used as shown the valve will be lapping as desired for the particular use here shown. O-rings 78, 79 are assembled on the full diameter inner end of stem 43 and supported thereon against movement to the right by thrust collar 80 secured on stem 43 by set screw 81 shown in Fig. 3.

The operation of the valve of this invention in the system shown is as follows:

Assuming that the valve 44 of this invention is assembled as shown into the exhaust braking system of Fig. 1 and that the truck air brake system maintains a supply of air under pressure in air supply line 17, assuming that the truck is in use on the highway and comes to a downgrade or other reason for retarding its free running forward motion, then the driver will move operating lever 47 of valve 46 to admit some air from line 17 to exhaust brake line 48. Since the drivers intent is to retard the motion of the truck he will have taken his foot off of pedal 20 and springs 82 connected between bell crank 24 and truck frame 12 will have returned link 32 to the right to its minimum fuel position. Bracket 40 on link 32 will have been previously positioned to just clear the end of stem 43 of valve 44 when link 32 is in its minimum fuel position and stem 43 is in its farthest to the right position.

Under these conditions regardless of the position of stem 43 in valve 44 the air under pressure admitted to line 48 will fill tube 56 and inlet port 77 of valve 44. Should stem 43 be at any position to the left of its farthest right position spring 74 will have urged collar 71 to the right along stem 43 until inlet valve seat 76 in collar 71 will have closed on inlet valve 78. Thus passage of air through inlet port 77 will be blocked and air pressure in tube 56 will act on the piston formed by stem 43 and the parts carried thereon to move stem 43 to the right until the right hand end of collar 71 strikes the left hand end of ribs 70 formed on bore 67 of body 52. Further movement to the right of collar 71 is stopped but the air pressure in tube 56 through inlet port 77 is still effective on O-ring 78 which presses on O-ring 79 stopped by collar 80 fixed to stem 43. Thus the air pressure on O-ring 78 moves stem 43 against the bias of spring 74 until O-ring 79 closes in bore 66 closing exhaust valve 79, 66 and then moves O-ring 78 out of its seat 76 so that air from brake line 48 through tube 56 and inlet port 77 passes O-ring 78 between ribs 70 and out through outlet port 68 and outlet 64 to brake line 49. Thus whenever the driver lets up on fuel pedal 20 and turns handle 47 of valve 46 air from line 17 passes through valve 46 to line 48, sets valve 44 to the closed position of its exhaust valve 79, 66 and the open position of its inlet valve 78, 76 and passes on through line 49 to operating cylinder 38 to move piston rod 37 towards the closed position of the exhaust conduit damper fixed to shaft 35. Operator 38 is biased to the open damper position so that the damper position is determined by the air pressure in line 49 which in turn is determined by the driver's manipulation of valve 46. The driver soon learns the "feel" of the equipment and with gage 51 showing him the back pressure on the outlet manifold of the engine he can gage his application of the exhaust braking effort to his requirements. The open or through position of valve 44 is shown in Fig. 5.

If the truck is running down a long grade and the driver has set lever 47 to give him the retarding effort required to maintain a safe speed but the grade flattens out for a distance which would slow the truck unnecessarily the driver has two alternatives. He can move lever 47 to reduce pressure in line 48 to any amount of exhaust braking effort desired or he can leave lever 47 set to the position giving the exhaust braking effort he will soon again need and depress fuel feed pedal 20 slightly. The slight depression of pedal 20 moves link 32 to the left taking with it stem 43 of valve 44 which changes valve 44 from the setting shown in Fig. 5 to the setting shown in Fig. 6.

As seen in Fig. 6 a slight movement of stem 43 to the left presses collar 80 against O-ring 79 which starts to move along the bore of exhaust valve seat 64 pressing O-ring 78 to the left into the bore of inlet valve seat 76 in collar 71. First O-ring 78 closes on valve seat 76 against the air pressure in port 77 and closes port 77 against further supply of air to operator 38. Then O-ring 79 moves out of engagement with exhaust valve seat 66 and air escapes to atmosphere from operator 38 through line 49, port 68, between ribs 70, bore 46 and exhaust port 69 of valve 44.

The exhaust brake is then out of operation and the truck is running under fuel throttle control until the grade again steepens and the driver lets up on the throttle pedal to shut off the engine power and automatically reapply the exhaust brake to the previous setting.

It is to be noted that valve 44 in no way interferes with the operation of foot pedal 20 since stem 43 and tube 56 are made long enough never to interfere with the motion of link 32. Thus valve 44 provides a mechanism for the purpose shown which is operative to change from one setting position to another in a very short distance of travel of pedal 20 at the beginning of its downward travel. Beyond this short distance the built in overtravel of stem 43 allows pedal 20 to be depressed to the floorboard without interference yet when the pedal is released valve 44 functions to take over its proper duty at the proper time.

Having thus recited one object or purpose for which the valve of this invention is adapted, described its construction and explained its use and foreseeing many other equivalent forms and applications of the device, I claim:

1. An overtravel stop and waste valve for the control air line of a pneumatic operator, said valve comprising an elongated valve body having a cylindrical interior major bore adapted at one end to be connected to said control air line and at the other end to said operator, said valve body being formed near its said other end with a reduced diameter intermediate bore extension of said major bore and a minor bore of smaller diameter than said intermediate bore formed through said body from said intermediate bore to the outside thereof, all of said bores being coaxial, an elongated stem slidably guided in said minor bore extending from outside said body to the interior thereof, an inlet valve collar slidably sealed in said major bore, said valve collar being formed with a central bore therethrough coaxial with said major bore and a counterbore at its end nearest said intermediate bore, said stem extending loosely through said central bore, a first abutment secured on said stem at its end within said major bore, a compression coil spring coaxially carried on said stem between said abutment and said collar, a second abutment secured on said stem within said intermediate bore, said counterbore of said valve collar forming a seat for an inlet valve, said intermediate bore forming a seat for an exhaust valve, said inlet and said exhaust valve being carried on said stem between said collar and said second abutment and an exhaust port formed through said body from said intermediate bore to the outside thereof, whereby with said stem in any axial position with respect to said body when air under pressure is applied to said major bore at said one end said air will press said stem and the said parts carried thereon towards said other end of said major bore to seat said exhaust valve in said exhaust valve seat and then to press said inlet valve away from said inlet valve seat to pass air from said major bore through said collar around said stem and through said inlet valve seat past said inlet valve to said operator and thereafter if said stem is externally pressed inwardly of said body said inlet valve will be closed on said inlet valve seat said exhaust valve will be pressed away from said exhaust valve seat and said stem and the parts carried thereon will move into said major bore any desired distance without changing the settings of either said inlet valve or said exhaust valve.

2. A cylinder and piston type overtravel stop and waste valve for the control air line of a pneumatic operator comprising a cylinder connected at one end to said control air line and at the other end to said operator, a piston collar slidably sealed to the interior wall of said cylinder, a stem for said piston collar slidably guided in an axial hole through said other end of said cylinder, an exhaust port formed through a wall of said cylinder near its said other end, a cylindrical exhaust valve seat formed in said cylinder to enclose an exhaust space between said cylinder and said exhaust port, a combined inlet and exhaust valve carried on said stem, said piston collar being loosely carried on said stem to form an inlet port therebetween, an inlet valve seat formed on said collar on its end adjacent said combined valve, and means biasing said collar on said stem towards said combined valve on said stem, whereby with said stem carrying said piston collar in any of its axial positions along said cylinder if air under pressure is applied to the interior of said cylinder at said one end said stem and said parts carried thereon will be urged towards said other end of said cylinder first to close said combined valve on said exhaust valve seat and then to move said combined valve from said inlet valve seat to pass air from said control air line to said operator and thereafter if said stem is urged from outside said cylinder towards the interior thereof first to close said combined valve on said inlet valve seat then to move said combined valve from said exhaust valve seat to exhaust said air from said operator after which said stem can be moved any desired distance into said cylinder without changing the settings of said valves.

3. A cylinder and piston type overtravel stop and waste valve for the control air line of a pneumatic operator comprising a valve body having an elongated cylindrical interior space connected at one end to said air line and at the other end to said operator, said interior space having a reduced diameter axial extension thereof formed in said body at said other end to form a cylindrical exhaust valve seat enclosing an exhaust space, an exhaust port formed through said body from said exhaust space to the exterior thereof, a stem slidingly guided axially of said cylindrical space in a hole formed through said other end of said body, a piston collar slidingly sealed to the wall of said cylindrical space and loosely surrounding said stem to form an inlet port therebetween, an inlet valve and an exhaust valve carried on said stem, an inlet valve seat formed on said piston collar on its side adjacent said inlet valve and means biasing said piston collar on said stem towards its position of closure on said inlet valve.

4. An overtravel stop and waste valve for the control air line of a pneumatic operator said stop and waste valve comprising: a valve body formed with a hollow cylindrical inlet space open at one end, a cylindrical exhaust valve seat coaxial with said inlet space extending said inlet space at the other end thereof, an outlet port opening laterally from said inlet space at said other end, an exhaust port opening laterally from said exhaust seat and a bore through said other end coaxial with said inlet space; a stem slidingly supported in said bore, one end of said stem being outside said valve and the other end of said stem extending axially into said inlet space; a first abutment formed on said stem at its said other end within said space and a second abutment spaced from said first abutment formed on said stem within said space; an inlet and exhaust valve carried on said stem at said second abutment; an inlet valve seat collar slidingly sealed to the interior of said inlet space, said collar loosely surrounding said stem between said abutments and formed with a cylindrical inlet valve seat at its ends adjacent said inlet and exhaust valve; and resilient means strained between said first abutment and said collar on said stem to bias said collar towards said inlet and exhaust valve.

References Cited in the file of this patent

UNITED STATES PATENTS

| | | |
|---|---|---|
| 663,727 | Christie | Dec. 11, 1900 |
| 1,845,995 | Topp | Feb. 16, 1932 |
| 1,887,428 | Powell | Nov. 8, 1932 |
| 2,243,781 | Thornhill | May 27, 1941 |
| 2,695,035 | Brown | Nov. 23, 1954 |